US012580305B2

(12) United States Patent
Kamyshev

(10) Patent No.: US 12,580,305 B2
(45) Date of Patent: Mar. 17, 2026

(54) LOW PROFILE DEVICE COMPRISING LAYERS OF COUPLED RESONANCE STRUCTURES

(71) Applicant: HUAWEI TECHNOLOGIES CO., LTD., Shenzhen (CN)

(72) Inventor: Timofey Kamyshev, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 18/320,003

(22) Filed: May 18, 2023

(65) Prior Publication Data

US 2023/0335894 A1 Oct. 19, 2023

Related U.S. Application Data

(63) Continuation of application No. PCT/EP2020/082615, filed on Nov. 19, 2020.

(51) Int. Cl.
*H01Q 3/00* (2006.01)
*H01Q 9/04* (2006.01)

(52) U.S. Cl.
CPC ............. *H01Q 3/00* (2013.01); *H01Q 9/0414* (2013.01)

(58) Field of Classification Search
CPC ....... H01Q 3/00; H01Q 9/0414; H01Q 9/0457
See application file for complete search history.

(56) References Cited

U.S. PATENT DOCUMENTS 5,497,164 A 3/1996 Croq
6,133,882 A 10/2000 Lafleur et al.
2013/0222200 A1* 8/2013 Ju ...................... H01Q 15/0013 343/833
2017/0117633 A1 4/2017 Park et al.

FOREIGN PATENT DOCUMENTS

CN 107046183 A * 8/2017 ............... H01Q 1/38

* cited by examiner

*Primary Examiner* — Dieu Hien T Duong

(74) *Attorney, Agent, or Firm* — Leydig, Voit & Mayer, Ltd.

(57) ABSTRACT

Various embodiments relate to an antenna design enabling beam-steering antenna arrays for communication in a high radio frequency spectrum. A device may comprise a first layer of resonance structures; a second layer of resonance structures, wherein the resonance structures of the first layer are configured to be electromagnetically coupled with the resonance structures of the second layer; a feeding element configured to electromagnetically excite the first and the second layer of the electromagnetically coupled resonance structures, wherein the first and the second layers are stacked with the feeding element substantially symmetrically with respect to an axis perpendicular to a plane defined by the feeding element, and wherein distances of geometric centers of the resonance structures of the second layer from the axis differ from distances of geometric centers of the resonance structures of the first layer from the axis. A device and a method of fabricating the device are disclosed.

17 Claims, 10 Drawing Sheets

LOW PROFILE DEVICE COMPRISING LAYERS OF COUPLED RESONANCE STRUCTURES

CROSS-REFERENCE TO RELATED APPLICATIONS

This application is a continuation of International Application No. PCT/EP2020/082615, filed on Nov. 19, 2020, the disclosure of which is hereby incorporated by reference in its entirety.

TECHNICAL FIELD

The disclosure generally relates to the field of wireless communications. In particular, some embodiments of the disclosure relate to design of compact devices with a wide bandwidth for radio frequency communication.

BACKGROUND

More and more radio technologies may need to be supported in a mobile device. These technologies may include cellular technologies, such as 2G/3G/4G radio, as well as non-cellular technologies. In the coming 5G NR (5th generation new radio) technology, the used frequency range will be expanded from sub 6 GHz to the so-called millimeter wave (mmWave) frequencies, e.g., 24 GHz, 28 GHz, 39 GHz, and 42 GHz. In the mmWave frequency range, an antenna array may be used to form a beam with a higher gain to overcome a higher path loss in the propagation media. However, an antenna radiation pattern and an array beam pattern with the higher gain may result in a narrow beam width. Beam steering techniques such as a phased antenna array can be utilized to steer the beam towards a different direction on demand. However, when it comes to user equipment (UE) such as a mobile terminal, the device may be used in an arbitrary orientation. Thus, it may be desired for UE antenna design to exhibit a very wide, nearly full spherical, beam coverage. Moreover, the UE may have certain requirements on its industrial design, such as thinner design of the device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective of the disclosure to provide a device and a method enabling beam-steering antenna arrays for communication in a high radio frequency spectrum, for example, above 24 GHz. The embodiments of the disclosure enable a thin antenna design suitable for example for use between two relatively closely placed surfaces, for example between a battery and a back cover of a mobile phone or between a metal moulding and a dielectric surface, etc.

The foregoing and other objectives may be achieved by the features of the independent claims. Further implementation forms are apparent from the dependent claims, the description, and the drawings.

According to a first aspect, a device for radio frequency communications is provided. The device may comprise a first layer of resonance structures. The device may further comprise a second layer of resonance structures. The resonance structures of the first layer are configured to be electromagnetically coupled with the resonance structures of the second layer. The device may further comprise a feeding element configured to electromagnetically excite the first and the second layer of the electromagnetically coupled resonance structures, wherein the first and the second layers may be stacked with the feeding element substantially symmetrically with respect to an axis perpendicular to a plane defined by the feeding element, and wherein distances of geometric centers of the resonance structures of the second layer from the axis differ from distances of geometric centers of the resonance structures of the first layer from the axis. This solution enables a compact antenna design that can cover wide bandwidth with dual-polarization broadside radiation. This is enabled by the stacked design with multilayered parasitic elements on top of the exciting feeder, wherein adjacent layers are electromagnetically coupled and the resonant structures are not symmetrically positioned on top of each other. The layered resonant structures provide at least one additional resonant frequency while dimensions of the device can be kept relatively small. High gain and wide scan range may be achieved with the design.

According to an implementation form of the first aspect, the device may further comprise at least one additional layer comprising at least one resonance structure, wherein the at least one resonance structure of the additional layer is electromagnetically coupled with at least one resonance structure of at least one layer next to the at least one additional layer and stacked symmetrically with respect to the axis, and wherein a distance of a geometrical center of the at least one resonance structure of the additional layer from the axis differs from the distances of the geometric centers of the resonance structures of the second layer and the geometric centers of the resonance structures of the first layer from the axis. This solution enables the number of resonant frequencies may to be increased with the number of additional layers of the resonant frequencies.

According to an implementation form of the first aspect, the first layer of the electromagnetically coupled resonance structures comprises a different number of the resonance structures compared to at least one of the second layer or the additional layer of the electromagnetically coupled resonance structures. Hence, it may be possible to use resonance structures of different size within an antenna structure. In other words, the first layer may have a different number of bigger or smaller resonance structures compared to the second layer, wherein planar sizes of both layers are the same or nearly the same.

According to an implementation form of the first aspect, the first layer of the electromagnetically coupled resonance structures may comprise resonance structures of a different size compared to at least one of the second layer or the additional layer of the electromagnetically coupled resonance structures. This solution enables to have a different overlapping ratio of the resonance structures and different coupling coefficients between the resonance structures. Therefore, it is possible to get resonances at different frequencies and to control the resonance frequencies.

According to an implementation form of the first aspect, the first layer of the electromagnetically coupled resonance structures may comprise resonance structures of a different shape compared to at least one of the second layer or the additional layer of the electromagnetically coupled resonance structures. This solution enables to improve coupling between at least some of the resonance structures and reduce coupling for other elements in different layers.

According to an implementation form of the first aspect, the feeding element comprises a patch antenna and at least one of a probe feed or an electromagnetically coupled feed. Hence, different implementations for feeding the antenna patch may be used. This solution enables to increase isolation between polarizations using differential feeding structure of the feeding element. Furthermore, this enables to obtain a circular polarized antenna with a circular polarized feeding element.

According to an implementation form of the first aspect, the patch antenna comprises one of a circle ring shaped patch antenna, a rectangle ring shaped patch antenna, a solid circle shaped patch antenna, or a solid rectangle shaped patch antenna. Hence, functionality of the device is not dependent on a single patch antenna design.

According to an implementation form of the first aspect, a height of the device from a ground plane level to an outermost stacked element is smaller or equal to 0.025λ, wherein λ is a wavelength associated with a frequency range of the radio frequency communications. Hence, an extremely low profile antenna design may be enabled with the multilayer structure.

According to an implementation form of the first aspect, the axis perpendicular to the feeding element is aligned with a center of the feeding element. This solution enables different layers of electromagnetically coupled resonance structures to be symmetrically stacked in relation to a center of the feeding element for efficient design to improve transmission of cross-polarized signals According to an implementation form of the first aspect, the device may further comprise a gap between the first layer of resonance structures and the second layer of the resonance structures. This solution enables to get different coupling coefficients between the resonance structures, when implemented in a printed circuit board (PCB) stack up, and thereby additional resonance frequencies and their control may be enabled. In one implementation form the gap between the first layer of resonance structures and the feeding element may be smaller than the gap between the first layer of resonance structures and the second layer of resonance structures.

According to a second aspect, an antenna array is provided. The antenna array may comprise a plurality of the devices according to the first aspect. This solution enables providing a compact, low profile antenna array arrangement that can cover wide bandwidth with dual-polarization broadside radiation. High gain and wide scan range may be achieved with the design.

According to a third aspect a method for fabrication of a device for radio frequency communications is disclosed. The method may comprise stacking a first and a second layer of resonance structures with a feeding element substantially symmetrically with respect to an axis perpendicular to a plane defined by the feeding element, wherein the resonance structures of the first layer are configured to be electromagnetically coupled with the resonance structures of the second layer, wherein distances of geometric centers of the resonance structures of the second layer from the axis differ from distances of geometric centers of the resonance structures of the first layer from the axis, and wherein the feeding element is configured to electromagnetically excite the first and the second layer of the resonance structures. The method enables fabrication of the device according to the first aspect and the advantages of the device.

Implementation forms of the disclosure can thus provide a device and a system for radio frequency communications. These and other aspects of the disclosure will be apparent from the example embodiment(s) described below.

DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DETAILED DESCRIPTION

Figure 1A:
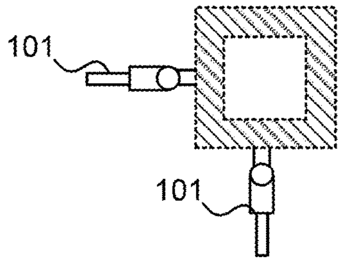
FIG. 1A illustrates an example of feeding components of a device with a multilayer antenna structure for radio frequency communications, according to an embodiment of the disclosure.
Figure 1B:
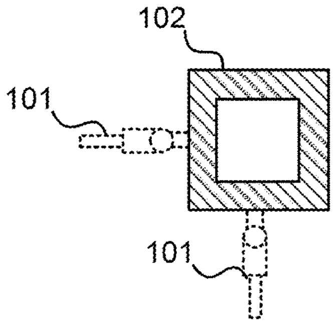
FIG. 1B illustrates an example of an antenna patch of a device with a multilayer antenna structure for radio frequency communications, according to an embodiment of the disclosure.

Reference will now be made in detail to example embodiments, examples of which are illustrated in the accompanying drawings. The detailed description provided below in connection with the appended drawings is intended as a description of the embodiments and is not intended to represent the only forms in which the examples may be constructed or utilized. The description sets forth the functions of the examples and the sequence of operations for constructing and operating the examples. However, the same or equivalent functions and sequences may be accomplished by different examples.

An antenna, for example mmWave antenna, may be implemented in a module. The module may be assembled to a main circuit board of a UE, which is provided as an example of a device. The mmWave antenna module may comprise a PCB (printed circuit board) where a mmWave antenna array may be implemented. Direction of a main radiation beam the antenna array may be towards an end-fire direction of the antenna array, which may be parallel to a display of the UE. The mmWave antenna module may comprise also a RFIC (radio frequency integrated circuit). In some embodiments the RFIC and the antenna PCB may be integrated in a single package. A number of mmWave modules may be placed at different locations of the UE. Different mmWave modules may provide beamforming in corresponding angular ranges. This may enable to sufficiently cover as much of a sphere as possible. Dual-polarized antenna radiation may be provided by the mmWave module(s). A baseband modem may facilitate two independent data streams effectively utilizing dual polarizations to facilitate MIMO (multiple input, multiple output) communications. A broadside radiation beam array module may be placed for example next to the back cover of the UE. The back cover may be made of plastic, glass, ceramic, or other non-conductive material. The radiation beam of the antenna module may be configured to cover the back space of the UE as the broadside antenna array may radiate perpendicular to the UE and towards the backside of the UE. This may present a limitation in the applicability of the module in a particular UE device. Even though some embodiments of the disclosure have been described using mmWave frequencies as an example, it is appreciated that the disclosed embodiments may be applied to implement antennas or antenna arrays at any suitable frequency range.

On the other hand, very high requirements such as wide broadband and low-profile may be presented to patch antennas. The patch antennas may have many attractive features such as a planar configuration, a low profile and two polarizations. Patch antennas may be also called antenna patches. However, the patch antennas may not provide sufficiently wide operating bandwidth for some applications. In general, it may be desired to design as low profile antenna as possible with good antenna efficiency and a wide operation bandwidth. A bandwidth of rectangular microstrip patch antennas may be, for example, 8% (bandwidth central frequency ±4%) or 3% and it may not be possible to reduce the thickness much smaller than 0.06 of a wavelength $\lambda$ without degrading efficiency and bandwidth of the antenna. Additional resonance may be achieved by stacking two patch antennas. However, this increases the antenna profile. The bandwidth may be increased, for example, using a patch antenna with parasitic elements around the patch. However, this may not enable the height of the antenna profile to be decreased and the planar size of the antenna may need to be increased. A low profile, high frequency, and high gain may be achieved with a metasurface layer above a patch antenna. However, the achievable bandwidth may be limited by an available size of the module. Further, a high level of isolation between cross-polarizations, for example −15 dB, may be difficult to achieve in a dual polarized wide bandwidth patch antenna design with the metasurface layer.

An objective of the disclosure is to achieve a compact antenna design with extremely low profile, such as less than a $0.025\lambda$ profile, that can cover a wide bandwidth, for example more than 20% of the center frequency, with dual-polarization broadside radiation. Further, the planar size of the antenna may not need to be increased. According to an embodiment, a device comprises a feeding element stacked with two or more layers of electromagnetically coupled resonance structures. The multiple layers of electromagnetically coupled resonance structures may be electromagnetically fed by the feeding element. The two or more layers comprising one or more of the resonance structures may be stacked with the feeding element substantially symmetrically with respect to an axis perpendicular to a plane defined by the feeding element, and wherein distances of geometric centers of the resonance structures of the second layer from the axis differ from distances of geometric centers of the resonance structures of the first layer from the axis. The layers may be positioned above or below the feeding element. The device may have a relatively low profile and improve achievable frequency bandwidth with high gain and scan range.

Figure 1C:
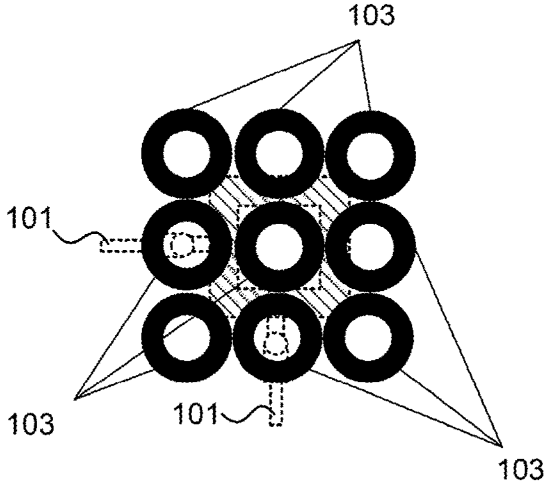
FIG. 1C illustrates an example of a first layer of resonance structures of a device with a multilayer antenna structure for radio frequency communications, according to an embodiment of the disclosure.
Figure 1D:
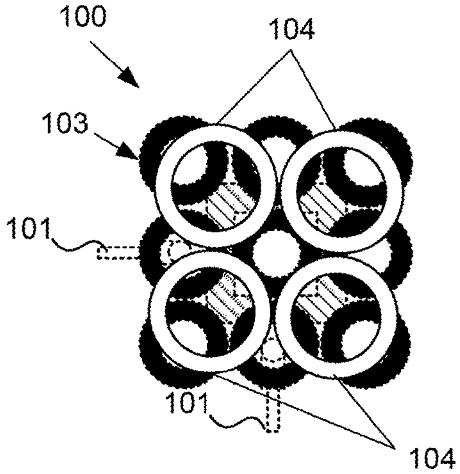
FIG. 1D illustrates an example of a second layer of resonance structures of a device with a multilayer antenna structure for radio frequency communications, according to an embodiment of the disclosure.
Figure 2:
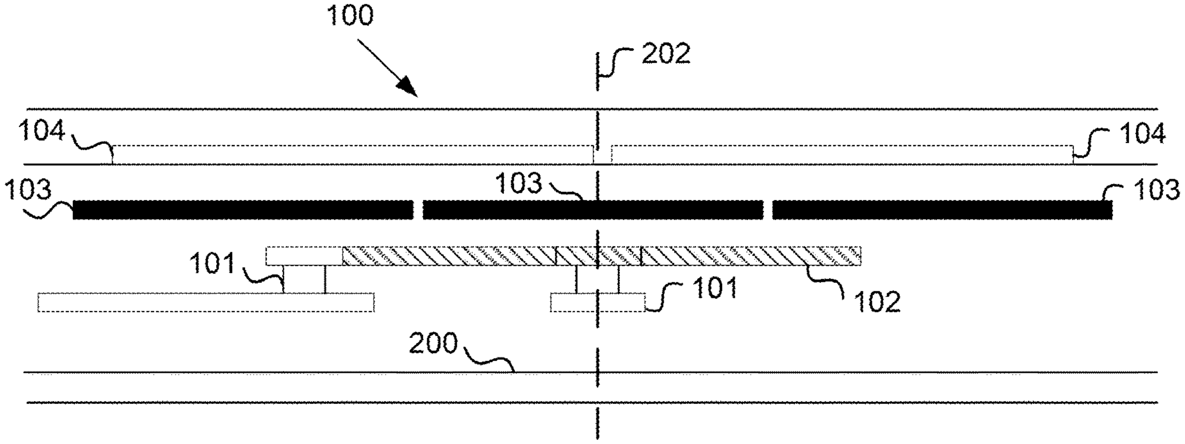
FIG. 2 illustrates an example of a cross-sectional view of a device with a multilayer antenna structure for radio frequency communications, according to an embodiment of the disclosure.

FIGS. 1A-1D illustrates examples of design elements of a device 100 with a multilayer antenna structure for radio frequency communications, according to an embodiment of the disclosure. The device 100 may comprise a patch antenna. The design elements are depicted from above. A feeding element of the device 100 may comprise, for example, a patch antenna 102. An electrical signal may be coupled to the feeding element by a plurality of feeding components. A feeding component may be, for example, a probe feed 101 or an electromagnetically coupled feed, for example a capacitively coupled feed, which may be also referred to as capacitive feeding. The feeding element may be configured to excite resonance structures layered above or below the feeding element. The device 100 may comprise a first layer comprising at least one resonance structure 103, as shown in FIG. 1C. The device 100 may further comprise a second layer comprising at least one resonance structure 104 stacked with the feeding element and the first layer of resonance structures, as shown in FIG. 1D. The resonance structures of the first and the second layer may be electromagnetically coupled to each other. In an embodiment, the resonance structures of the first and the second layer may be electromagnetically tightly coupled. The design elements may be layered such that one or more of the probe feeds 101, the patch antenna 102, the first layer of resonance structures 103 and the second layer of resonance structures 104 are vertically (along axis 202) positioned at different levels, as illustrated in an example of a cross-sectional view of the device 100 in FIG. 2. In an embodiment, the feeding element, the first layer and the second layer of the resonance structures may be arranged above a ground plane level 200 parallel to each other (on top of each other) with a gap between them. The gap between the first layer 103 and feeding element 102 may be smaller than the gap between the first layer 103 and the second layer 104. The gap may be filled, for example, with a material with insulating properties. The patch antenna 102 may be positioned very close to the ground plane, for example at a distance of 0.015λ. The different layers of resonance structures 103, 104 may be stacked on top of the feeding element substantially symmetrically with respect to the (vertical) axis 202, which may be perpendicular to a plane defined by the feeding element. In an embodiment, the axis 202 may be located at a center of the patch antenna 102. Distances of geometric centers of the resonance structures 104 of the second layer from the axis may differ from distances of geometric centers of the resonance structures 103 of the first layer from the axis 202. Hence, the second layer of resonance structures 104 may be shifted in relation to the first layer of resonance structures 103 such that the stacked resonance structures are not completely aligned, i.e. at least a part of an area of a resonance structure of the first layer is not aligned with an area of a resonance structure of the second layer. In one example, none of the stacked resonance structures are completely aligned. The patch antenna 102 may be relatively small, for example having a length and a width of a 0.15λ, which may not provide sufficient resonance for operating independently, for example at 30 GHz, but which is able to excite the resonance structures 103, 104. The size of the device may be defined with respect to k which is a wavelength associated with a frequency range of the radio frequency communications of the device 100, for example a center frequency of the radio frequency communications.

Figure 3:
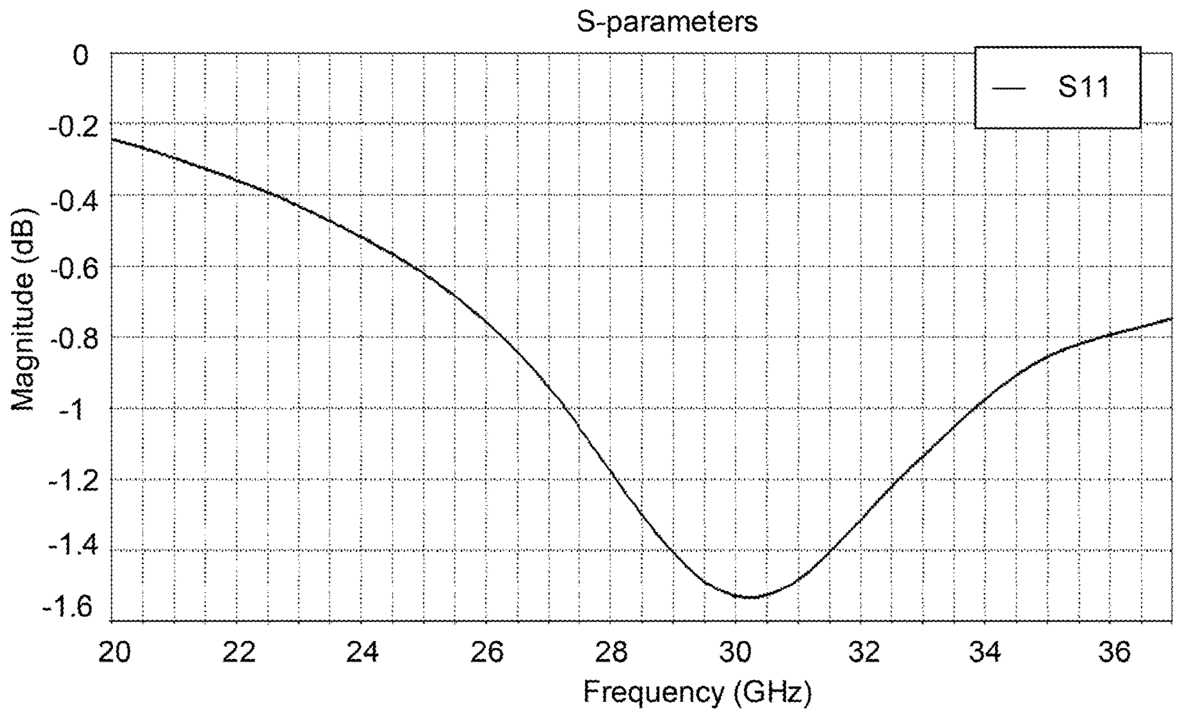
FIG. 3 illustrates an S11 graph of an exciting patch, according to an embodiment of the disclosure.
Figure 4:
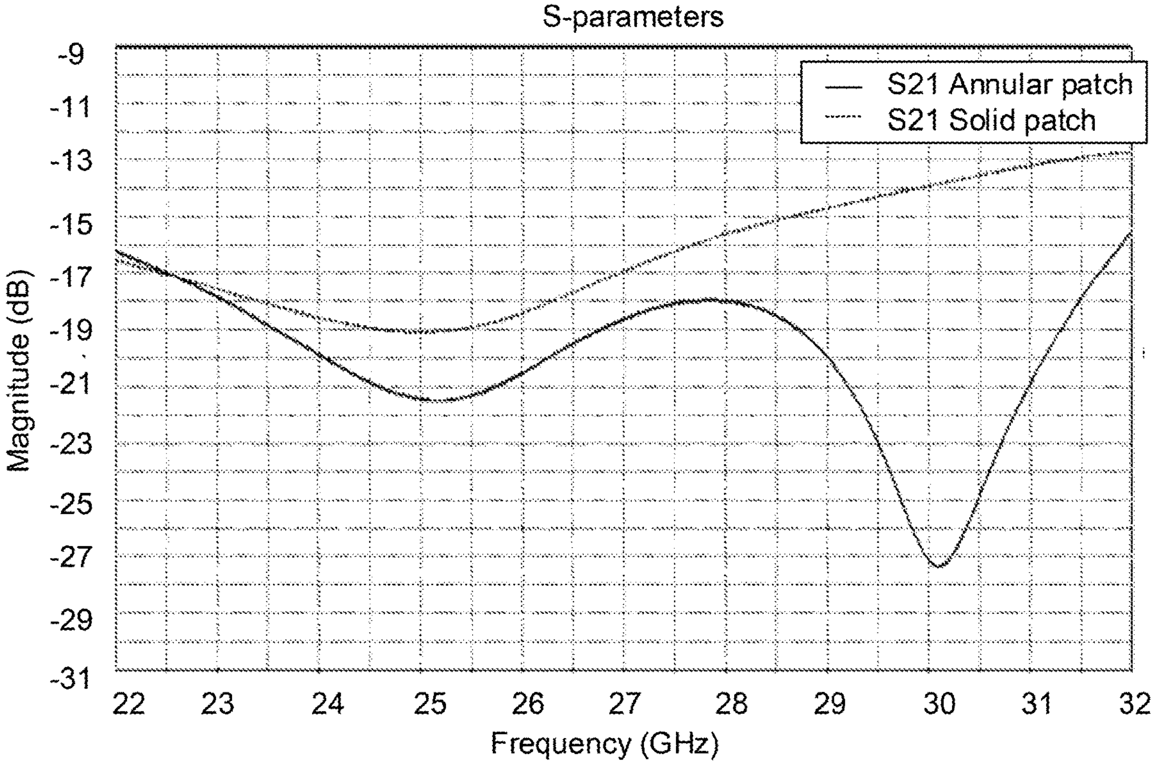
FIG. 4 illustrates an example of port isolation of cross-polarization for an annular and a solid antenna patch design, according to an embodiment of the disclosure.

FIG. 3 illustrates an example of an S11 graph of the exciting patch antenna 102 separately without resonance structures. The S11 graph describes return loss of the patch antenna 102 in general. The patch antenna 102 may be an annular or a square ring-shaped patch antenna, which may improve cross-polarized isolation for the final design of the device 100. However, the patch antenna 102 may have any shape, such as a solid circle or a solid rectangular shape. In an embodiment, the feeding element may comprise a folded monopole antenna instead of the patch antenna 102. The folded monopole antenna may be selected for example in case of a single polarization. Cross-polarized port by port isolation for an annular/ring and a solid antenna patch design is illustrated in a diagram in FIG. 4 in terms of S21 parameter.

Figure 5:
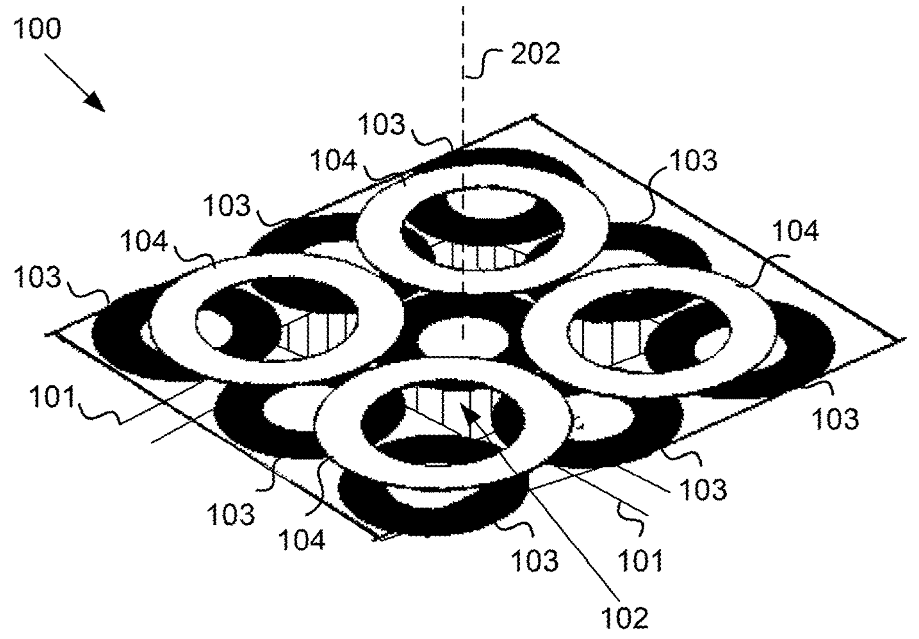
FIG. 5 illustrates an example of a device comprising a double layer of electromagnetically coupled resonance structures, according to an embodiment of the disclosure.

FIG. 5 illustrates an example of a device comprising two layers of electromagnetically coupled resonance structures 103, 104, according to an embodiment of the disclosure. The two electromagnetically coupled layers of resonance structures 103, 104 may be configured to provide a main resonance and an additional resonance. The resonance structures of each of the two layers may be substantially symmetrically located in relation to the axis 202 perpendicular to a plane defined by the feeding element, for example the patch antenna 102. The resonance structures 103 of the first layer may be shifted relative to the resonance structures 104 of the second layer. The centroids of both the first and the second layer of resonance structures 103, 104 may be located at the same horizontal (direction of the plane defined by the feeding element) location in relation to the axis 202. However, the distance from the plane defined by the feeding element differs. Furthermore, distances of the centroids of each of the resonance structures 103 in the first layer from the axis 202 may differ from distances of the centroids of each of the resonance structures 104 in the second layer from the axis 202. For example, the resonance structures in the different layers may not be positioned on top of each other such that the centroids of the resonance structures at the different layers would be vertically aligned.

In an embodiment, the first and the second layer of resonance structures 103, 104 may have different numbers of the resonance structures. For example, the first layer may comprise nine resonance structures 103. The second layer may comprise four resonance structures 104. The resonance structures of the first layer may be arranged to collectively form a rectangular resonance structure geometry, as illustrated for example in FIG. 1C. Similarly, resonance structures of other layer(s) may be arranged to collectively form a rectangular resonance structure geometry. In an embodiment, the first layer of resonance structures 103 may have resonance structures of different size compared to the second layer of resonance structures 104. In an embodiment, the first layer of resonance structures 103 may comprise resonance structures of different shape compared to the resonance structures 104 of the second layer. In an embodiment, at least one of the first or the second layer of resonance structures 103, 104 may have resonance structures of different sizes or different shapes, for example, circle and oval resonance structures. A total planar size (perpendicular to the axis 202) of the first and second layers of resonance structures 103, 104 may be equal or less to a planar size of a reference antenna patch without stacked layer(s) of resonance structures, wherein the size of the reference antenna patch is calculated for one narrow resonance frequency range. The reference antenna patch may be a rectangular patch antenna, such as for example a rectangular microstrip antenna, which has no stacked layer(s) of resonance structures. For example, the simple antenna patch size may be calculated for a dielectric constant of 3, dielectric height of 0.35 mm and an operation frequency of 24 GHz, which results a width of 4.416 mm and a length of 3.450 mm. For comparison, with reference to FIG. 5 the planar width and length of the first layer of resonance structures 103 may be, for example, 3.88 mm and the width and length of the second layer of the resonance structures 104 may be 3.47 mm. Both of the first and the second layer with the multi-resonance properties may be placed above or below the feeding element. A planar size of the patch antenna 102 may be smaller than the planar sizes of the resonance structure layers, because it may be only used for a poor resonance for excitation of the resonance structures.

Figure 6:
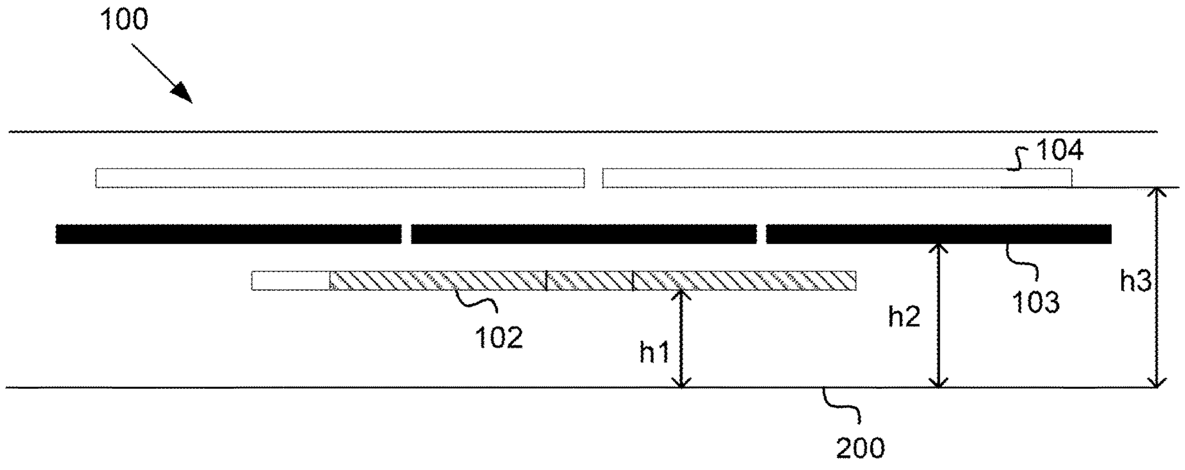
FIG. 6 illustrates an example of a cross-sectional view of a device comprising a double layer of electromagnetically coupled resonance structures, according to an embodiment of the disclosure.

FIG. 6 illustrates an example of a cross-sectional view of a device 100 comprising two layers of electromagnetically coupled resonance structures 103, 104, according to an embodiment of the disclosure. The resonance layers may be placed above a feeding element to simplify a manufacturing process. For example, vias for patch antenna 102 may be easier to design when the resonance layers are positioned above the patch antenna 102. When placed below, staggered via design may be required. The stacked design of the elements may enable a compact and a low profile design of the device 100. For example, the patch antenna 102 may be positioned h1=0.174 mm above a ground plane 200, the first layer of resonance structures 103 h2=0.236 mm above the ground plane 200 and the second layer of resonance structures 104 h3=0.35 mm above the ground plane 200. It is however noted that the above values are provided as examples, and the distances h1, h2, and h3 of the layers in relation to the ground plane 200 may depend on the application and desired design parameters.

Figure 7:
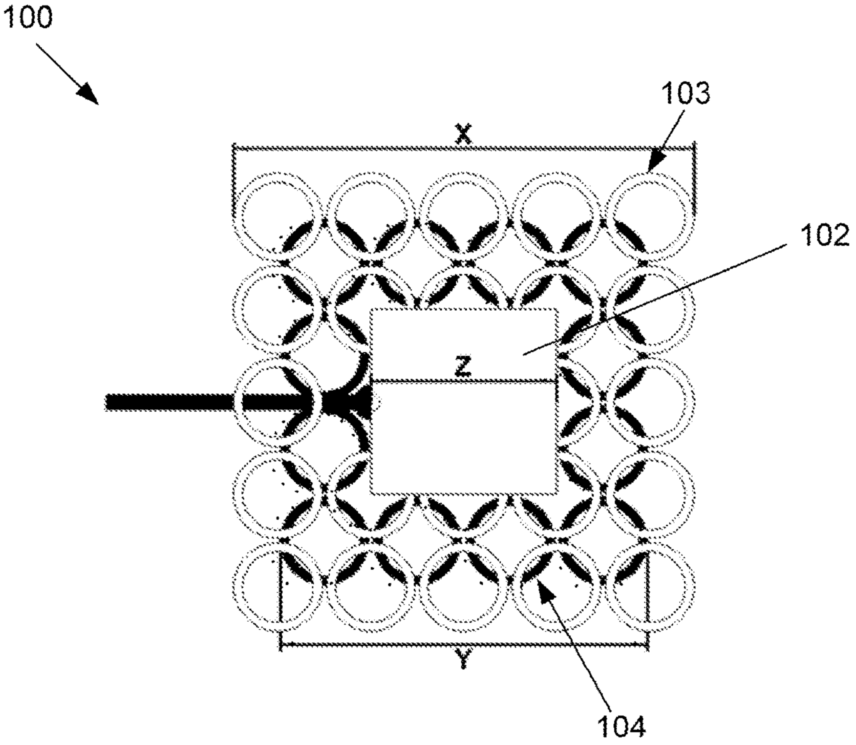
FIG. 7 illustrates an example of a device comprising a two layers of electromagnetically coupled resonance structures arranged below a feeding element, according to an embodiment of the disclosure.

FIG. 7 illustrates an example of a device 100 comprising two layers of electromagnetically coupled resonance structures 103, 104 arranged below a feeding element, according to an embodiment of the disclosure. The device 100 may comprise a plurality of resonance structures 103 in a first layer positioned below patch antenna 102, which represents the feeding element in this example. The device 100 may further comprise a plurality of resonance structures 104 in a second layer positioned below the first layer. In an embodiment, the resonance structures 103, 104 may be identical, for example in terms of their size and shape, but arranged differently in relation to the patch antenna 102. The layers may also comprise different numbers of the resonance structures 103, 104. Width (z) of the patch antenna 102 may be in the range of 1.7 to 1.9 mm, for example 1.8 mm. Width (y) of the first layer of resonance structures 103 may be in the range of 4.9 mm to 5.1 mm, for example 5.05 mm. Width (x) of the second layer of resonance structures 104 may be in the range of 3.9 mm to 4.1 mm, for example 4.03 mm.

Figure 8:
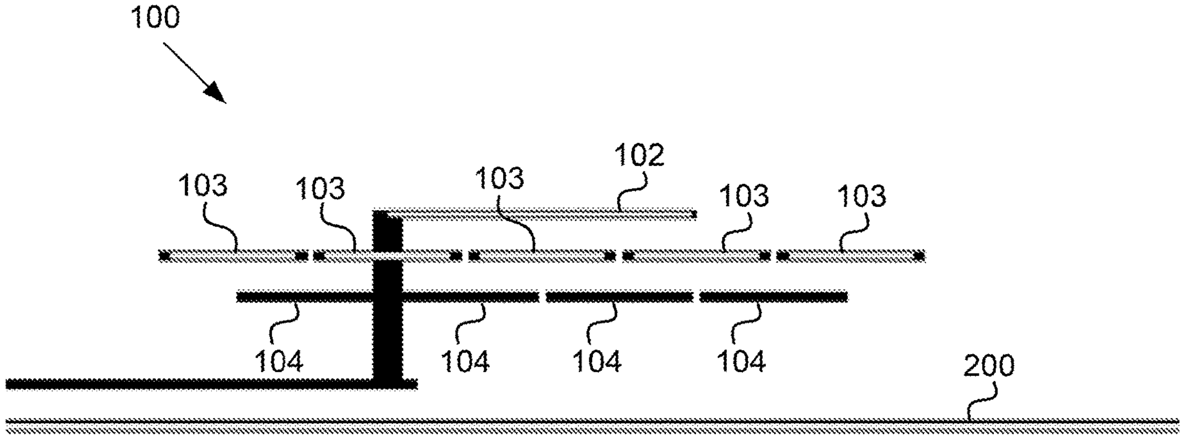
FIG. 8 illustrates an example of a cross-sectional view of a device comprising two layers of electromagnetically coupled resonance structures arranged below a feeding element, according to an embodiment of the disclosure.

An example of a cross-sectional view of the device 100 is illustrated in FIG. 8. The first and the second layer of the resonance structures 103, 104 may be stacked with the patch antenna 102 above a ground plane 200. The outermost element in relation to the ground plane may be the patch antenna 102 and the first and the second layer of resonance structures 103, 104 may be arranged between the patch antenna 102 and the ground plane 200 such that there is a gap between each layer 102, 103, 104, 200. The gap may comprise dielectric material, such as a liquid crystal polymer (LCP) or polyimide.

Figure 9A:
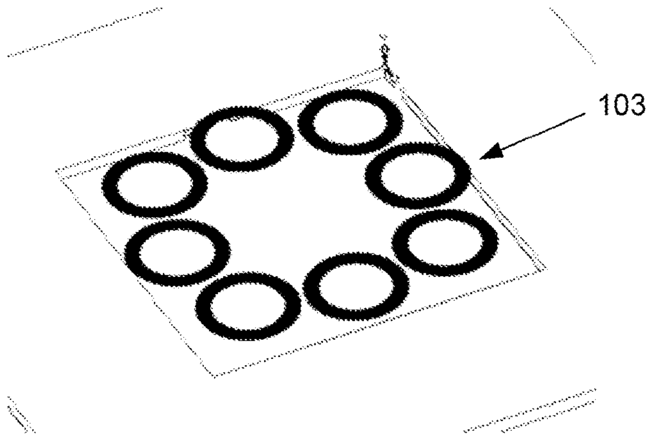
FIG. 9A illustrates an example of a first layer of resonance structures with a different shape of resonance structures compared to a second layer of resonance structures, according to an embodiment of the disclosure.
Figure 9B:
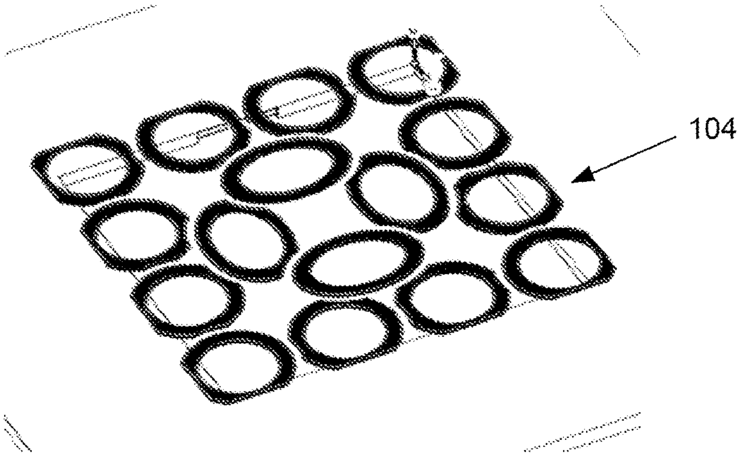
FIG. 9B illustrates an example of a second layer of resonance structures with a different shape of resonance structures compared to a first layer of resonance structures, according to an embodiment of the disclosure.

In an embodiment, the resonance structures 103, 104 of the different layers may have different shapes. FIG. 9A illustrates an example of a first layer of resonance structures 103 and FIG. 9B illustrates an example of a second layer of resonance structures 104, which may be arranged in the same device. The first layer of the resonance structures 103 may comprise, for example, a plurality of circle ring shaped resonance structures arranged substantially in a circle. The second layer of resonance structures 104 may comprise similar circle ring shaped resonance structures arranged in a rectangle-shaped ring and ellipse-shaped resonance structures positioned in a middle of the ring. A layer may have any suitable shape, arrangement and/or number of resonance structures, which may be electromagnetically coupled with the resonance structures of the next layer.

Figure 10:
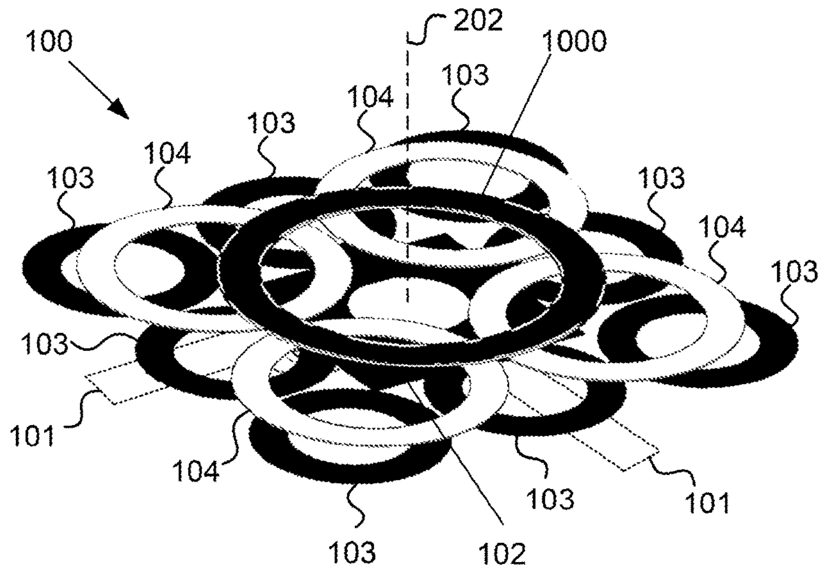
FIG. 10 illustrates an example of a device comprising three layers of electromagnetically coupled resonance structures, according to an embodiment of the disclosure.

In an embodiment, the device 100 may comprise more than two layers of resonance structures. FIG. 10 illustrates an example of the device 100 comprising three layers of electromagnetically coupled resonance structures 103, 104, 1000, according to an embodiment of the disclosure. The third layer may comprise at least one resonance structure 1000. The third layer may be positioned substantially symmetrically in relation to the same axis 202 perpendicular to a plane defined by the feeding element, for example patch antenna 102 and the other layers of resonance structures 103, 104. The centroid of the resonance structure 1000 may not be aligned with centroids of any of the resonance structures 103, 104 of the other layers. In an embodiment, the third layer may comprise one resonance structure 1000, which may be for example of a similar shape as the resonance structures of the first and second layers. However, the resonance structure 1000 may have bigger size to improve coupling with at least the resonance structures 104 of the second layer. The third layer of resonance structures 1000 may be configured to provide a third resonance frequency.

Figure 11:
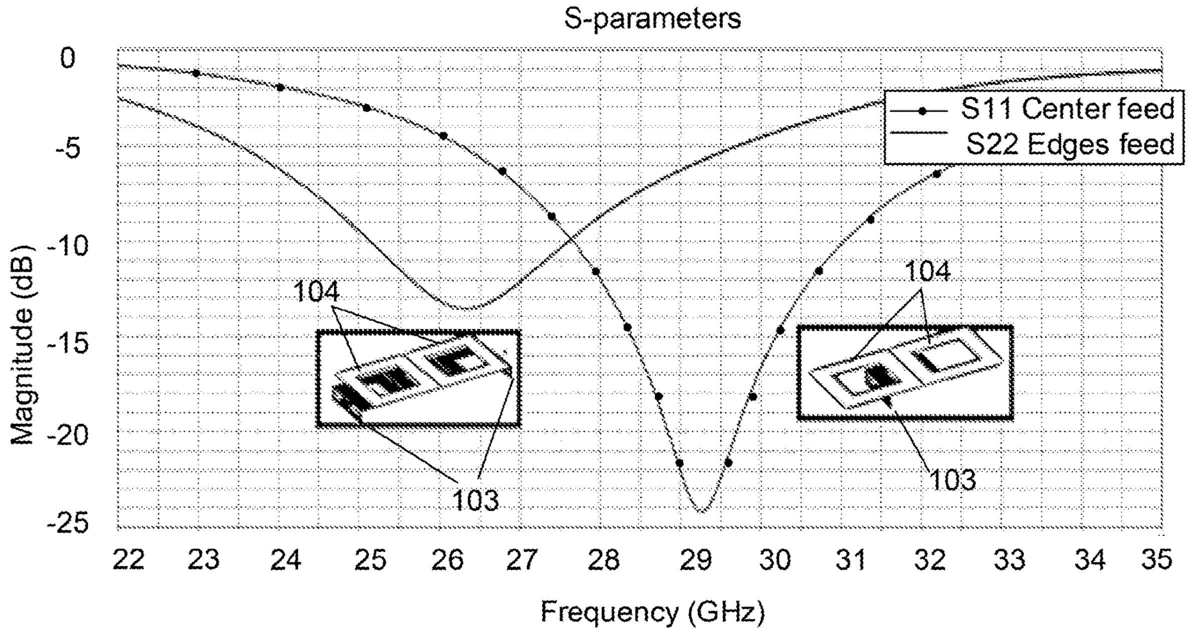
FIG. 11 illustrates an example of resonance frequencies of antenna elements with direct excitation of resonance structures, according to an embodiment of the disclosure.
Figure 12:
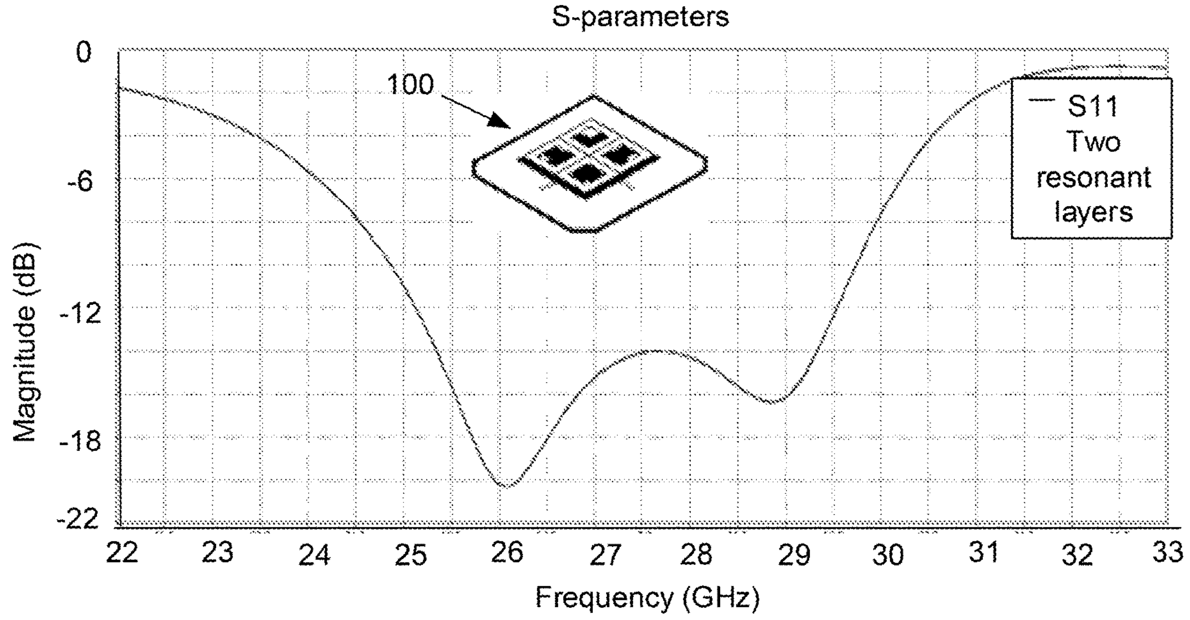
FIG. 12 illustrates an example of resonance frequencies of a device comprising a multilayer of electromagnetically coupled resonance structures with excitation by a patch, according to an embodiment of the disclosure.

FIG. 11 illustrates resonance frequencies of antenna elements with direct excitation, according to an embodiment of the disclosure. A model with direct excitation of resonance structures 103, 104 for different shapes of the resonance structures 103, 104 was used for checking the resonance frequency of the elements. Simulation results with two layers of resonance structures 103, 104 with direct excitation of the elements are shown in the diagram of FIG. 11, which illustrates the S11 and S22 parameters for center and edge feed of the antenna elements, respectively. The second layer was excited by feeding current to a resonance structure 103 located by a center of the second layer and by feeding current to resonance structures 103 of the first layer located by edges of the second layer. With the shown direct excitation, a low frequency resonance may be provided by exciting the three resonance structures of the first layer of resonance structures 103 and the two resonance structures of second layer of resonance structures 104. A high frequency resonance may be provided by exciting the center resonance structure of the first layer and the two resonance structures of second layer. Results for a full model of a device 100 with multiple layers of electromagnetically coupled resonance structures with similar size, shape, stack-up and patch exciting is illustrated in FIG. 12. Isolation between ports of the device 100 may correspond to the results shown in FIG. 4.

Figure 15:
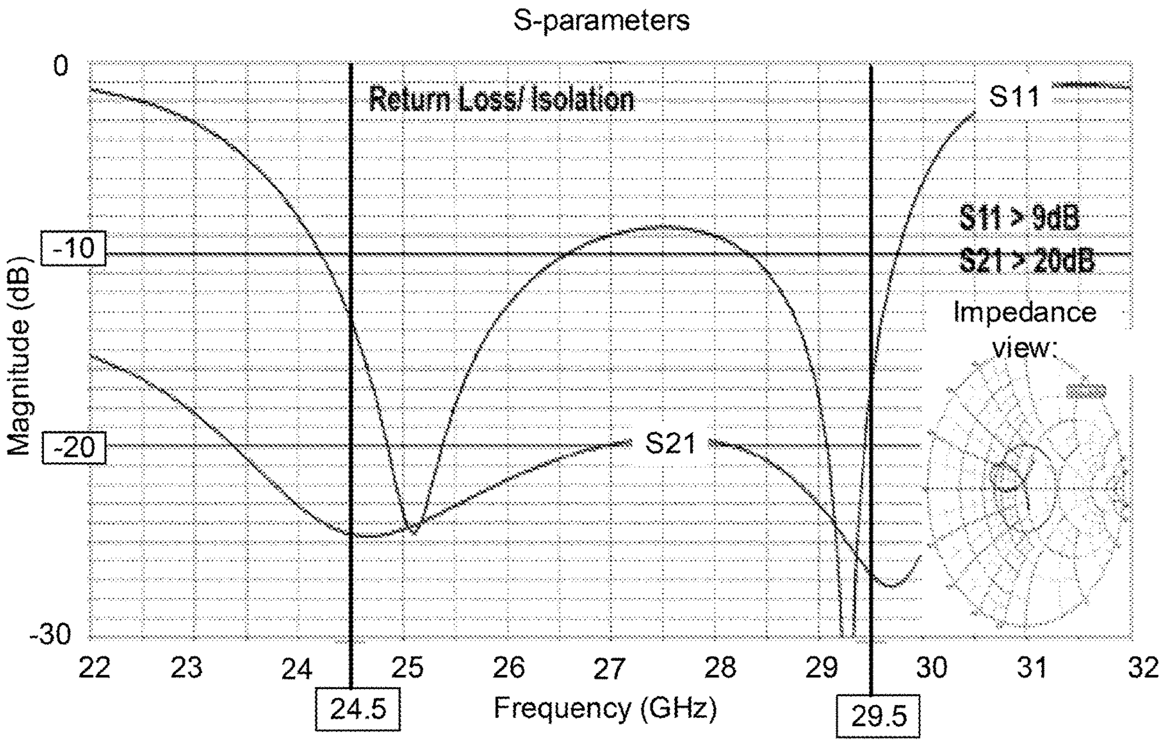
FIG. 15 illustrates an example of return loss and isolation between ports of dual-polarized antenna element, according to an embodiment of the disclosure.

With a proper design of the above features, a compact antenna design with a wide operation frequency band, a high efficiency, and a high gain with wide beam scanning may be achieved. At least two resonance frequencies may be achieved, for example at F_low=25 GHz and F_high=29.25 GHz, as shown in FIG. 15. The simulation results in FIG. 15 also show a good isolation between the dual-polarization antenna feedings.

Figure 13:
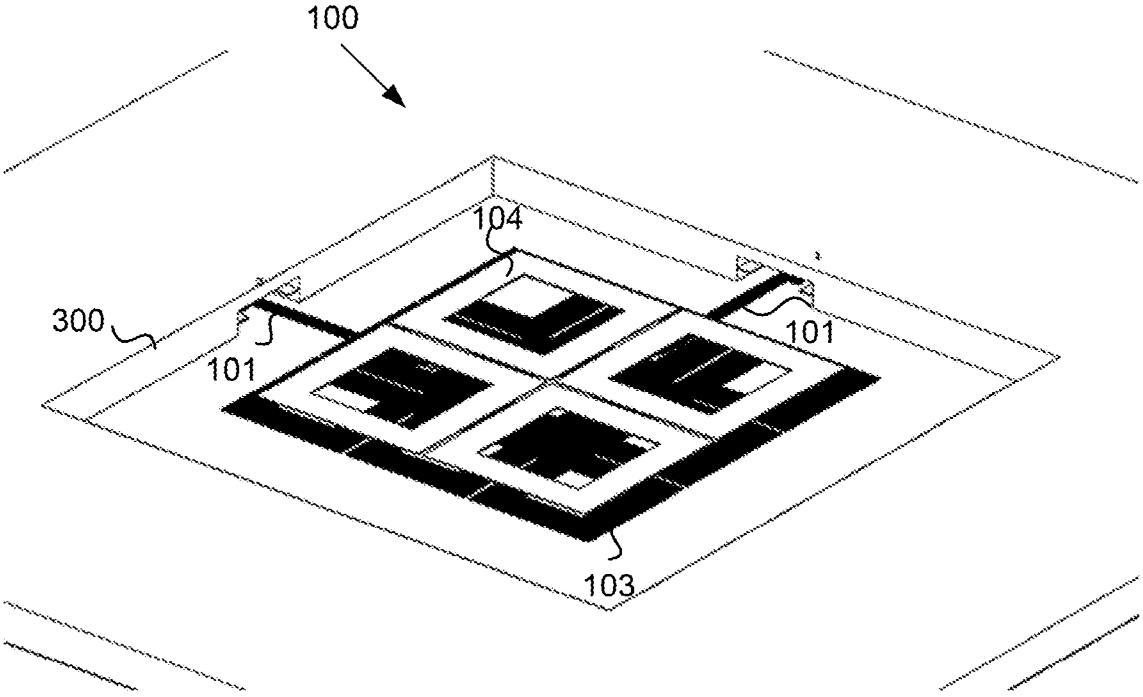
FIG. 13 illustrates an example of a device with a multi-layer multi-resonant structure with a cavity, according to an embodiment of the disclosure.
Figure 14:
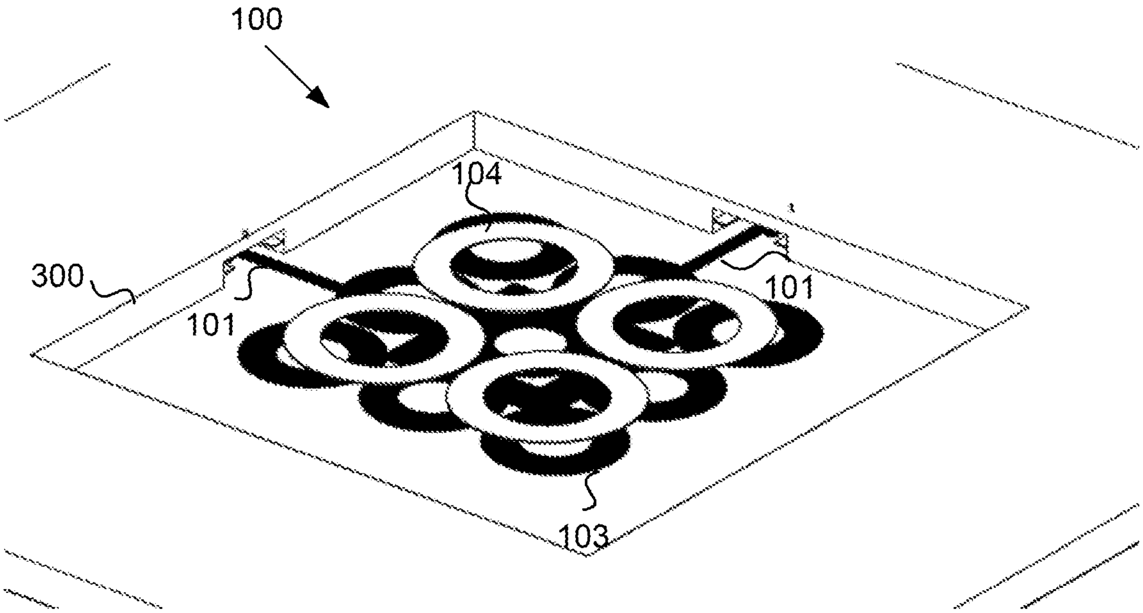
FIG. 14 illustrates another example of a device with a multilayer multi-resonant structure with a cavity, according to an embodiment of the disclosure.
Figure 16:
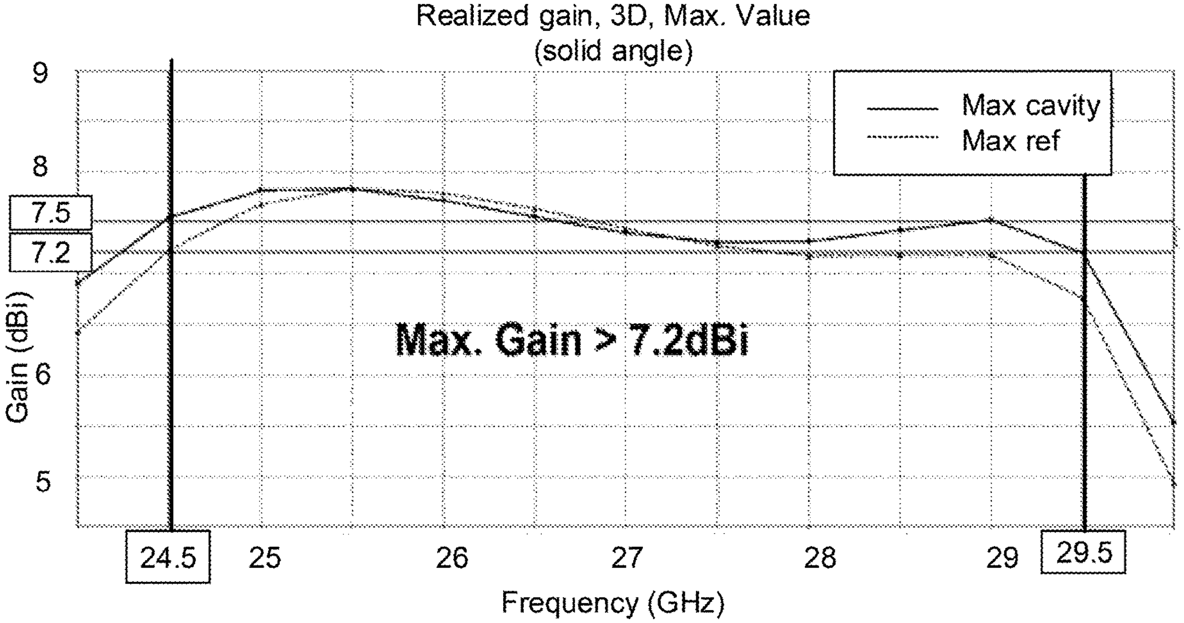
FIG. 16 illustrates a gain graph in a frequency range of 24 GHz-30 GHz of a device with multilayer multi-resonant antenna structure, according to an embodiment of the disclosure.

FIG. 13 illustrates an example of a device 100 with multiple layers of multi-resonant structures 103, 104 located in a cavity 300, according to an embodiment of the disclosure. The cavity 300 around the device 100 may not give any additional resonance in the multilayer and multi-resonant design, and it may be applied to provide an open area for the device 100. The device 100 may be implemented within the cavity 300, for example such that electric feeding lines, such as a strip-line, are provided for the device 100 from the sides instead of from the bottom of the device 100. FIG. 14 illustrates another example of the device 100 with a multi-layer multi-resonant structure located in a cavity, wherein the resonant structures 103, 104 are circle shaped rings instead of square shaped rings. The different shapes may affect, for example, the coupling between elements as they cover the other elements differently. In this design, the device 100 may be operated also without the surrounding cavity 300. Hence, more freedom for industrial design may be achieved because it is not restricted by the cavity. As shown in simulation results in FIG. 16, the antenna element has a high gain in a wide frequency band with or without the cavity 300.

Figure 17:
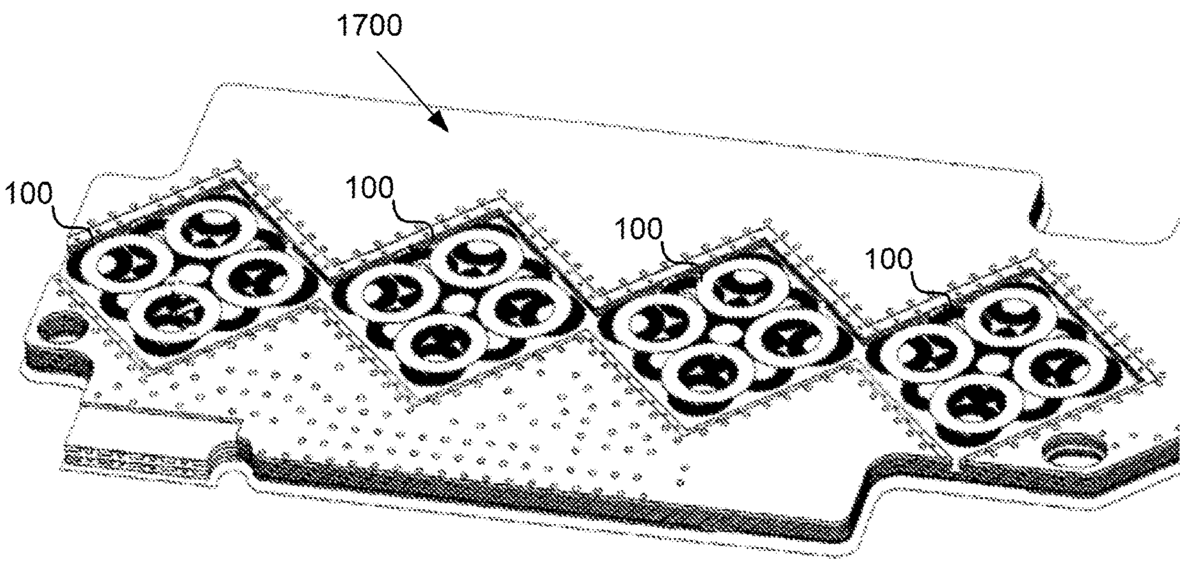
FIG. 17 illustrates an example of a one by four elements linear array of four dual-polarized antennas, according to an embodiment of the disclosure.
Figure 18:
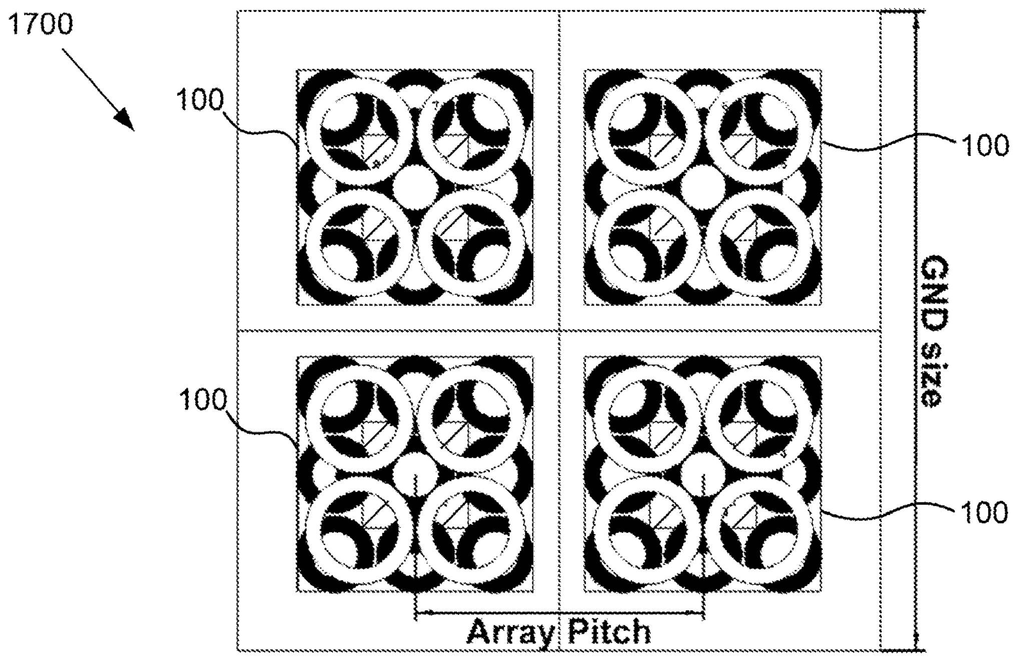
FIG. 18 illustrates an example of a two by two elements array of four dual-polarized antennas, according to an embodiment of the disclosure.

FIGS. 17 and 18 illustrate examples of antenna arrays comprising a plurality dual-polarized antennas, which antennas may be the devices 100. In FIG. 17, a linear array of four dual-polarized antennas is provided. In FIG. 18, a two-by-two array of four dual-polarized antennas is provided. The devices 100 may be however arranged in different ways and in different numbers to provide an antenna array.

Figure 19:
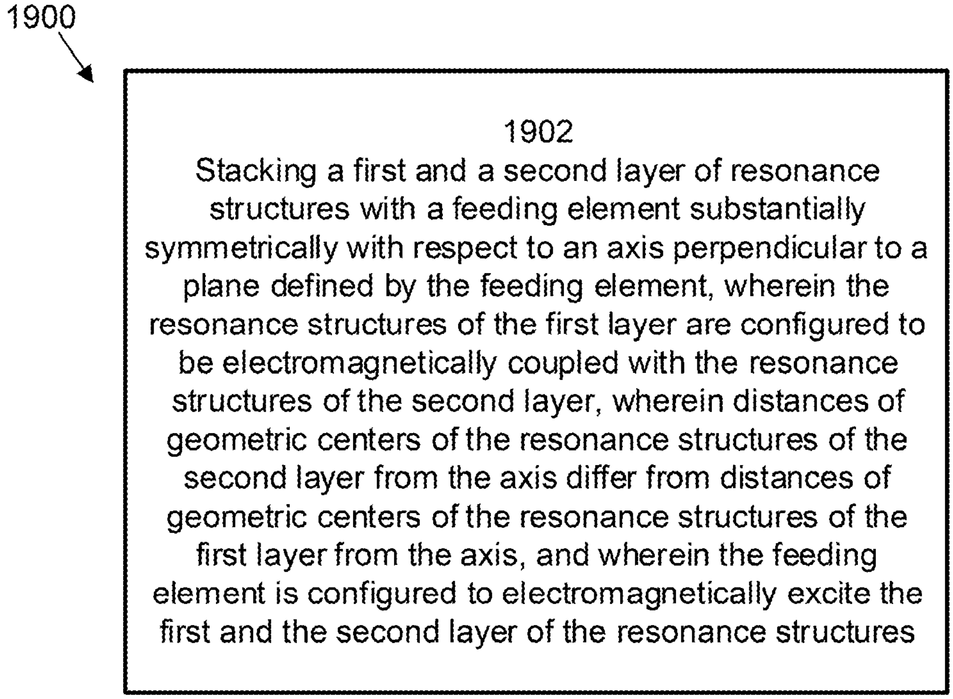
FIG. 19 illustrates an example of a method for fabrication of a device for radio frequency communications, according to an embodiment of the disclosure.

FIG. 19 illustrates an example of a method 1900 for fabrication of a device 100 for radio frequency communications. At 1902, the method may comprise stacking a first and a second layer of resonance structures 103, 104 with a feeding element substantially symmetrically with respect to an axis 202 perpendicular to a plane defined by the feeding element, wherein the resonance structures of the first layer 103 are configured to be electromagnetically coupled with the resonance structures of the second layer 104, wherein distances of geometric centers of the resonance structures of the second layer 104 from the axis differ from distances of geometric centers of the resonance structures of the first layer 103 from the axis 202, and wherein the feeding element is configured to electromagnetically excite the first and the second layer of the resonance structures 103, 104.

Further features of the methods directly result from the functionalities and parameters of the methods and devices, for example the device 100, as described in the appended claims and throughout the specification and are therefore not repeated here.

A device or a system may be configured to perform or cause performance of any aspect of the method(s) described herein. Further, a computer program may comprise program code configured to cause performance of an aspect of the method(s) described herein, when the computer program is executed on a computer. Further, the computer program product may comprise a computer readable storage medium storing program code thereon, the program code comprising instruction for performing any aspect of the method(s) described herein. Further, a device may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. Furthermore, references to 'at least one' item or 'one or more' items may refer to one or a plurality of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. A device for radio frequency communications, the device comprising:

a first layer of resonance structures;

a second layer of resonance structures, wherein resonance structures of the first layer are configured to be electromagnetically coupled with resonance structures of the second layer; and a feeding element configured to electromagnetically excite the first layer of resonance structures and the second layer of resonance structures, wherein the first layer of resonance structures and the second layer of resonance structures are stacked in a stack with the feeding element substantially symmetrically with respect to an axis perpendicular to a plane defined by the feeding element, wherein the first layer of resonance structures is between the second layer of resonance structures and the feeding element in the stack, and wherein distances of geometric centers of the resonance structures of the second layer from the axis differ from distances of geometric centers of the resonance structures of the first layer from the axis;

wherein a first gap exists between the first layer of resonance structures and the second layer of the resonance structures;

wherein a second gap exists between the first layer of resonance structures and the feeding element, wherein the second gap between the first layer of resonance structures and the feeding element is smaller than the first gap between the first layer of resonance structures and the second layer of resonance structures;

wherein a size of resonance structures in the first layer of resonance structures is less than a size of resonance structures in the second layer of resonances structures; and wherein a number of resonance structures in the first layer of resonance structures is greater than a number of resonance structures in the second layer of resonances structures.

2. The device of claim 1, further comprising:

at least one additional layer comprising at least one resonance structure, wherein the at least one resonance structure of the additional layer is electromagnetically coupled with at least one resonance structure of at least one layer of the first layer and the second layer and stacked substantially symmetrically with respect to the axis, and wherein a distance of a geometrical center of the at least one resonance structure of the additional layer from the axis differs from the distances of the geometric centers of the resonance structures of the second layer and the geometric centers of the resonance structures of the first layer from the axis.

3. The device of claim 2, wherein the first layer of resonance structures comprises resonance structures of a different size compared to the at least one resonance structure of the additional layer.

4. The device of claim 2, wherein the first layer of resonance structures comprises resonance structures of a different shape compared to the at least one resonance structure of the additional layer.

5. The device of claim 1, wherein the feeding element comprises:

a patch antenna; and at least one of a probe feed or an electromagnetically coupled feed.

6. The device of claim 5, wherein the patch antenna comprises one of a circle ring shaped patch antenna, a rectangle ring shaped patch antenna, a solid circle shaped patch antenna, or a solid rectangle shaped patch antenna.

7. The device of claim 1, wherein a height of the device in a direction of the axis is less than or equal to 0.025λ, wherein λ is a wavelength associated with a frequency range of the radio frequency communications.

8. The device of claim 1, wherein the axis perpendicular to the plane defined by the feeding element is aligned with a center of the feeding element.

9. An antenna array, comprising:

a plurality of devices, wherein each device of the plurality of devices comprises:

a first layer of resonance structures;

a second layer of resonance structures, wherein resonance structures of the first layer are configured to be electromagnetically coupled with resonance structures of the second layer; and a feeding element configured to electromagnetically excite the first layer of resonance structures and the second layer of resonance structures, wherein the first layer of resonance structures and the second layer of resonance structures are stacked in a stack with the feeding element substantially symmetrically with respect to an axis perpendicular to a plane defined by the feeding element, wherein the first layer of resonance structures is between the second layer of resonance structures and the feeding element in the stack, and wherein distances of geometric centers of the resonance structures of the second layer from the axis differ from distances of geometric centers of the resonance structures of the first layer from the axis;

wherein a first gap exists between the first layer of resonance structures and the second layer of the resonance structures;

wherein a second gap exists between the first layer of resonance structures and the feeding element, wherein the second gap between the first layer of resonance structures and the feeding element is smaller than the first gap between the first layer of resonance structures and the second layer of resonance structures;

wherein a size of resonance structures in the first layer of resonance structures is less than a size of resonance structures in the second layer of resonances structures; and wherein a number of resonance structures in the first layer of resonance structures is greater than a number of resonance structures in the second layer of resonances structures.

10. The antenna array of claim 9, wherein each device of the plurality of devices comprises:

at least one additional layer comprising at least one resonance structure, wherein the at least one resonance structure of the additional layer is electromagnetically coupled with at least one resonance structure of at least one layer of the first layer and the second layer and stacked substantially symmetrically with respect to the axis, and wherein a distance of a geometrical center of the at least one resonance structure of the additional layer from the axis differs from the distances of the geometric centers of the resonance structures of the second layer and the geometric centers of the resonance structures of the first layer from the axis.

11. The antenna array of claim 10, wherein, for each device of the plurality of devices, the first layer of resonance structures comprises resonance structures of a different size compared to the at least one resonance structure of the additional layer.

12. The antenna array of claim 9, wherein, for each device of the plurality of devices, the feeding element comprises:

a patch antenna; and at least one of a probe feed or an electromagnetically coupled feed;

wherein the patch antenna comprises one of a circle ring shaped patch antenna, a rectangle ring shaped patch antenna, a solid circle shaped patch antenna, or a solid rectangle shaped patch antenna.

13. A method for fabrication of a device for radio frequency communications, the method comprising:

stacking in a stack a first layer of resonance structures and a second layer of resonance structures with a feeding element substantially symmetrically with respect to an axis perpendicular to a plane defined by the feeding element, wherein the first layer of resonance structures is between the second layer of resonance structures and the feeding element in the stack, wherein resonance structures of the first layer are configured to be electromagnetically coupled with resonance structures of the second layer, wherein distances of geometric centers of the resonance structures of the second layer from the axis differ from distances of geometric centers of the resonance structures of the first layer from the axis, and wherein the feeding element is configured to electromagnetically excite the first layer of resonance structures and the second layer of resonance structures;

wherein a first gap exists between the first layer of resonance structures and the second layer of the resonance structures;

wherein a second gap exists between the first layer of resonance structures and the feeding element, wherein the second gap between the first layer of resonance structures and the feeding element is smaller than the first gap between the first layer of resonance structures and the second layer of resonance structures;

wherein a size of resonance structures in the first layer of resonance structures is less than a size of resonance structures in the second layer of resonances structures; and wherein a number of resonance structures in the first layer of resonance structures is greater than a number of resonance structures in the second layer of resonances structures.

14. The method of claim 13, further comprising:

forming at least one additional layer comprising at least one resonance structure, wherein the at least one resonance structure of the additional layer is electromagnetically coupled with at least one resonance structure of at least one layer of the first layer and the second layer and stacked substantially symmetrically with respect to the axis, and wherein a distance of a geometrical center of the at least one resonance structure of the additional layer from the axis differs from the distances of the geometric centers of the resonance structures of the second layer and the geometric centers of the resonance structures of the first layer from the axis.

15. The method of claim 14, wherein the first layer of resonance structures comprises resonance structures of a different size compared to the at least one resonance structure of the additional layer.

16. The method of claim 13, wherein the feeding element comprises:

a patch antenna; and at least one of a probe feed or an electromagnetically coupled feed;

wherein the patch antenna comprises one of a circle ring shaped patch antenna, a rectangle ring shaped patch antenna, a solid circle shaped patch antenna, or a solid rectangle shaped patch antenna.

17. The method of claim 13, wherein a height of the device in a direction of the axis is less than or equal to $0.025\lambda$, wherein $\lambda$ is a wavelength associated with a frequency range of the radio frequency communications.

* * * * *